United States Patent [19]

Bourbonnaud et al.

[11] 4,454,851
[45] Jun. 19, 1984

[54] DEVICE FOR ECONOMICALLY PREHEATING FUEL BY RECOVERING ENERGY FROM THE FUEL ITSELF

[75] Inventors: Marc Bourbonnaud, Ville d'Avray; Jean Thelinge, Le Vesinet, both of France

[73] Assignee: Sarl Inotec, Ville D'Avray, France

[21] Appl. No.: 347,064

[22] Filed: Feb. 8, 1982

[30] Foreign Application Priority Data

Feb. 10, 1981 [FR] France .................. 81 03328

[51] Int. Cl.³ ............................ F02M 31/00
[52] U.S. Cl. .................... 123/557; 123/514; 123/516; 123/552
[58] Field of Search ............... 123/514, 516, 557, 552

[56] References Cited

U.S. PATENT DOCUMENTS

| | | | |
|---|---|---|---|
| 2,599,699 | 6/1952 | Dilworth | 123/516 |
| 4,146,002 | 3/1979 | Quinn | 123/557 |
| 4,326,492 | 4/1982 | Leibrand | 123/514 |
| 4,343,283 | 8/1982 | Shepherd | 123/514 |
| 4,393,851 | 7/1983 | Gorans | 123/557 |

*Primary Examiner*—Ronald H. Lazarus
*Attorney, Agent, or Firm*—Robert E. Burns; Emmanuel J. Lobato; Bruce L. Adams

[57] ABSTRACT

The invention relates to a fuel economizer preheating device operating by recovering energy from the fuel itself in the supply circuit of an engine, in particular but not exclusively a diesel engine. Part of the heat supplied to the fuel between the tank and the injectors is transferred by the excess fuel, not to the tank but upstream of the injection pump to the fuel arriving in this region.

The device is characterized by the fact that it comprises a heat exchanger (10) removing heat absorbed by the fuel in the vicinity of the injection pump or upstream of the latter and transferring the heat to the fuel arriving upstream of the injection pump (4).

Preferably, the exchanger (10) is located upstream of a filter (5) in the immediate vicinity of the latter.

A branch pipe (11), possibly integrated in the exchanger (10) makes it possible to by-pass the exchanger, depending on the temperature of the fuel.

1 Claim, 1 Drawing Figure

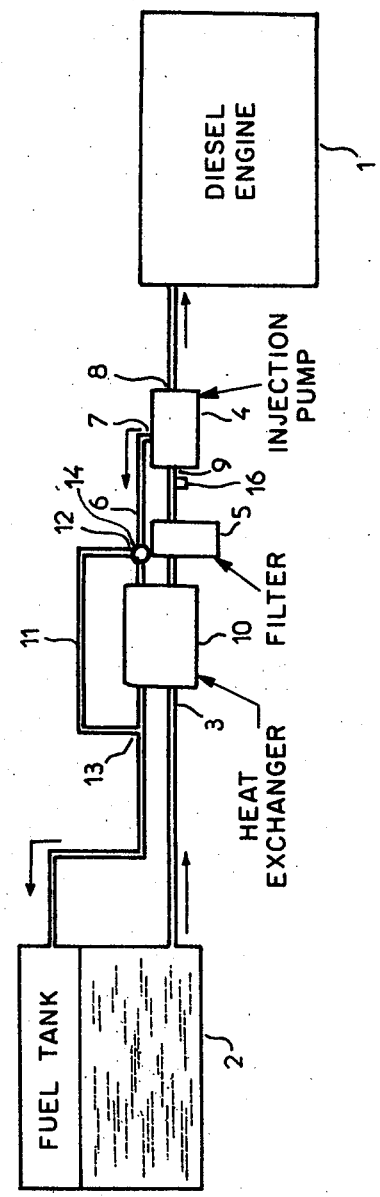

DEVICE FOR ECONOMICALLY PREHEATING FUEL BY RECOVERING ENERGY FROM THE FUEL ITSELF

The invention relates to a fuel economizer pre-heating device operating by recovering energy from the fuel itself. More particularly, the invention relates to a pre-heating device located in the supply circuit of an engine, in particular but not exclusively a diesel engine.

Supply circuits of this type comprise a tank, an injection pump supplying injectors and generally one or more filters located upstream of the injection pump. It is also known that the efficiency of an engine of this type is optimum when the temperature of the fuel is between two predetermined values corresponding to workshop test temperatures of the injection pump, or the optimum temperature of the fuel corresponding to the regulation of the pump/injectors system chosen by the manufacturer and which may vary according to the composition of the gas-oil, climatic conditions of the country etc.

Existing devices consist of exchangers in which heat is taken from the cooling water circuit, from the exhaust gases, or which comprise an electrical resistor supplied for example by the alternator or battery of the vehicle.

Furthermore, in general, a pipe returns the excess fuel at the outlet of the injection pump to the vehicle tank. Thus, this fuel circuit conveys to the quantity of fuel contained in the tank, heat supplied by the injection pump and possibly by a liquefying device located in the supply circuit of the injection pump. It may thus contribute to preheating the fuel contained in the tank.

However, in should be noted that owing to the disproportion between the quantity of fuel contained in the tank and the surplus fuel returned to the latter, also in view of the heat losses along the return pipe as well as through the wall of the fuel tank, this surplus fuel contributes only slightly to pre-heating the fuel contained in the tank.

Moreover, it should be noted that existing pre-heating devices require considerable modifications and/or additions to the fuel supply circuit, the cooling water circuit and/or the exhaust pipes.

One of the objects of the present invention is to propose a fuel economizer pre-heating device which recovers part of the heat which the fuel receives at the time of its compression in the injection pump.

Another object of the present invention is to propose an economizer pre-heating device which transfers the heat recovered to the fuel, not in the vicinity of the tank, but upstream of the injection pump and preferably upstream of the filter.

Another object of the present invention is to propose an economizer pre-heating device which requires only negligible modifications to the various parts of the engine.

Another object of the present invention is to propose an economizer pre-heating device in no way modifying the general construction of the circuits for supplying fuel to the injection pump and returning it to the tank, in particular by preventing recycling of the fuel from the return circuit directly into the supply circuit, by short-circuiting the tank, the drawback of this direct recycling being to modify the pressures and rates of flow of the fuel at the inlet and/or outlet of the injection pump, thus disturbing its regulation.

Other objects and advantages of the present invention will become apparent from the ensuing description, which however is given solely by way of example and is not intended to limit the latter.

The economizer device for pre-heating fuel by recovering energy from the fuel itself in the supply circuit of an engine, in particular but not exclusively a diesel engine, comprising a tank, an injection pump supplying injectors, is characterized by the fact that it comprises a heat-exchanger removing heat absorbed by the fuel in the region of the injection pump or possibly upstream of the latter, this removal being effected in the circuit for returning excess fuel from the injection pump to the tank and imparting the heat to the fuel arriving upstream of the injection pump.

The invention will be better understood on referring to the ensuing description and to the accompanying drawing which forms an integral part thereof.

The single FIGURE shows diagrammatically by way of example the application of the economizer pre-heating device according to the present invention in the case of a diesel engine.

In this drawing, the reference numeral 1 designates a diesel engine block. This engine is supplied with fuel, which is contained in a tank 2. A supply circuit 3 conveys the fuel to the engine, vai an injection pump 4 which supplies the injectors of the engine and preferably a filter 5 located upstream of the pump 4.

All these parts are known to a man skilled in the art and will not be described in more detail.

A pipe 6 connected to the injection pump returns the excess pumped fuel to the tank.

Owing to the compression which the fuel undergoes in the injection pump 4, its temperature at the outlets 7 and 8 of the injection pump is higher than its temperature at the inlet 9 of the pump.

By way of example, for a fuel of the gas-oil type, this temperature rise is of the order of 10° to 15° C.

According to the invention, the surplus fuel returned to the tank 2 through the pipe 6 passes through a heat exchanger 10.

This heat exchanger 10 is located in the supply circuit 3 of the engine 1 and at least upstream of the injection pump 4 and preferably upstream of the filter 5. Thus, the exchanger transfers the heat carried by the excess fuel in the pipe 6, to the fuel circulating in the supply pipe 3, before it reaches the injection pump and preferably before it reaches the filter 5.

In the case where a filter 5 is present in the supply circuit of the engine 1, the invention prefers placing the exchanger upstream of this filter. In fact, in cold weather, it makes it possible to pre-heat the fuel before it is introduced into the filter and thus contributes to preventing solidification of the latter, which is a particular drawback when it occurs in the filter. To this end, preferably, the exchanger 10 is located upstream of the filter, or if necessary of the first filter, in the immediate vicinity of the latter in order to prevent cooling of the fuel in the pipe between the exchanger 10 and the filter 5 and to prevent its solidification in the filter and possibly in the pre-filter.

The exchanger 10 is of any suitable type, in particular it is able to recover heat conveyed by the excess fuel in the pipe 6 and to transfer it to the fuel arriving upstream of the injection pump 4 and of the filter 5. In particular, it must be particularly robust in order to withstand the impacts and vibrations caused by the engine and transmitted by the vehicle chassis over several hundred thousand kilometers. On the other hand, the outer casing of the exchanger 10 should be made from a solid material which is a poor heat conductor, in order to prevent the dissipation of heat outside the latter.

Furthermore, the inner section of the pipes and exchange modules which constitute the exchanger should be sufficient to prevent restriction of the supply and return flows, which in particular would disturb the operation of the injection pump. For reasons of standardization, their section should be relatively great and in the vicinity of its inlet and outlet the exchanger comprises inter-changeable couplings which facilitate its adaptation to different diameters of the supply and return pipes of various types of engine.

The exchanger 10 thus recovers part of the heat which the injection pump imparts to the fuel at the time of its compression.

Naturally, other known methods of pre-heating, using for example the water for cooling the engine, the exhaust gases, or which are preferably constituted by an electrical resistance, could be associated with the heat exchanger 10, in order that the fuel is at the optimum temperature at the injectors of the engine.

When using a combination of means, the known means may be situated upstream of the exchanger 10 or downstream of the latter, preferably between the exchanger and the filter 5, or may be combined with the exchanger 10 or integrated in the latter.

In a preferred embodiment, a branch pipe 11 is located on the return pipe 6, in parallel with the part of this pipe constituting the exchanger 10. The branch pipe 11 is thus connected to the return pipe 6 at 12, upstream of the exchanger 10 and at 13, downstream of the latter.

Depending on the temperature of the fuel downstream of the heat exchanger 10, for example between the filter 5 and the injection pump 4 and preferably at the inlet of the latter, means such as an electrically operated valve 14 direct the excess fuel to the tank via the exchanger 10 or the branch pipe 11. This branch pipe may be physically independent of the exchanger, however, in order to simplify the mounting of the device on the return circuit, it is preferably integrated in the latter.

As a preferred example, a thermo-contact 16 whereof the threshold temperature is between 30° and 40° C., located in the vicinity of the inlet 9 of the injection pump 4 controls an electrically operated valve 14 located at 12. When the temperature of the fuel is less than the threshold, the electrically operated valve 14 controls the return of the excess fuel via the exchanger 10.

This temperature threshold of 30° to 40° C. may vary according to optimum regulating ranges chosen by the manufacturers.

Thus, in view of the fact that the filter 5 and the injection pump 4 are generally located in the vicinity of the engine 1, the exchanger 10 located directly upstream of the filter 5 makes it possible to recover the heat carried by the excess fuel substantially immediately after it leaves the injection pump. In a case where the exchanger is to be located at a distance from the pump, in particular if a pre-filter generally located not far from the tank existed originally, it is advantageous to insulate the pipes for the return and supply of fuel between the injection pump and the exchanger. This available quantity of heat is thus prevented from being lost along the return pipe to the tank, or is prevented from serving to pre-heat the fuel contained in the tank with an efficiency which is clearly less than that of the device according to the present invention.

Moreover, it should be noted that the device according to the invention in no way alters the supply of fuel to the engine 1, in view of the fact that the rates of flow and pressures are not changed, likewise the filtering members in the supply and return circuits.

Naturally, the description of the present invention is given solely by way of example and other embodiments of the present invention could be adopted by a man skilled in the art without diverging from the scope of the latter. In particular, the invention could find other applications than those in the framework of diesel engines.

What is claimed is:

1. A fuel supply system of an internal combustion engine comprising a fuel tank, a heat exchanger, a fuel filter and an injection pump, said heat exchanger being apart from any exhaust gas line of said engine and having only a first through passage and a second through passage in heat-exchanging relation to one another, fuel supply lines series connecting said fuel tank with said first passage of said heat exchanger, connecting said first passage of said heat exchanger with said filter and connecting said filter with said injection pump, and fuel return lines series connecting said fuel pump with said second passage of said heat exchanger and connecting said second passage of said heat exchanger with said fuel tank to return excess fuel from said fuel pump through said fuel return lines and said heat exchanger to said fuel tank, whereby heat imparted to fuel by said injection pump is in part transmitted from returned excess fuel through said heat exchanger to fuel in said supply lines upstream of said filter and returned fuel is thereby cooled, all of the excess fuel from said injection pump being returned to said fuel tank branch fuel return line by-passing said heat exchanger, valve means operative to pass said excess fuel from said injection pump alternatively through said heat exchanger or through said by-pass line, and means controlling said valve means, said control means comprising heat sensing means in said fuel supply line between said filter and said injection pump and operative to control said valve means to pass excess fuel through said by-pass line when the temperature sensed by said heat sensing means is above a predetermined valve.

* * * * *